United States Patent
Hoskinson et al.

(10) Patent No.: US 9,785,629 B2
(45) Date of Patent: *Oct. 10, 2017

(54) AUTOMATED LANGUAGE DETECTION FOR DOMAIN NAMES

(71) Applicant: VERISIGN, INC., Reston, VA (US)

(72) Inventors: Ronald Andrew Hoskinson, Oak Hill, VA (US); Lambert Arians, Asburn, VA (US); Marc Anderson, Ashburn, VA (US); Mahendra Jain, Sterling, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,414

(22) Filed: Dec. 15, 2015

(65) Prior Publication Data
US 2016/0232154 A1    Aug. 11, 2016

Related U.S. Application Data

(63) Continuation of application No. 13/648,645, filed on Oct. 10, 2012, now Pat. No. 9,218,335.

(51) Int. Cl.
*G06F 17/20* (2006.01)
*G06F 17/27* (2006.01)
(Continued)

(52) U.S. Cl.
CPC ........ *G06F 17/275* (2013.01); *G06F 17/2217* (2013.01); *G06F 17/30141* (2013.01);
(Continued)

(58) Field of Classification Search
CPC .... G06F 17/28; G06F 17/275; G06F 17/2217; G06F 17/2223; G06F 15/16; H04L 61/302; H04L 61/3035
(Continued)

(56) References Cited

U.S. PATENT DOCUMENTS 5,689,616 A * 11/1997 Li ................. G10L 15/005
                                                    704/232
6,167,396 A * 12/2000 Lokken ............ G06F 17/30395
                                                    707/737
(Continued)

OTHER PUBLICATIONS

Author Unknown, "IANA Internet Assigned Numbers Authority—Repository of IDN Practices" webpage, http://www.iana.org/domains/idn-tables, accessed Nov. 7, 2013, pp. 1-6.
(Continued)

*Primary Examiner* — Pierre-Louis Desir
*Assistant Examiner* — Forrest F Tzeng
(74) *Attorney, Agent, or Firm* — MH2 Technology Law Group, LLP

(57) ABSTRACT

Methods and systems for automated language detection for domain names are disclosed. In some embodiments, a method for detecting a language of an Internationalized Domain Name (IDN) comprises receiving, by an I/O interface, a string of characters for the IDN; receiving training data, including a plurality of multi-gram analyses for a set of languages; analyzing, by a processor, the string of characters based on the training data, wherein the analyzing includes extracting a set of multi-grams from the string of characters and comparing the extracted set of multi-grams with the training data; detecting the language of the IDN based on results of the analyzing. In some embodiments, the method further comprises comparing the detected language of the IDN with a user selected language and using the IDN to generate a domain name, if the comparing indicates that the detected language of the IDN is consistent with the user selected language.

15 Claims, 7 Drawing Sheets

(51) Int. Cl.
  *G06F 17/22* (2006.01)
  *G06F 17/30* (2006.01)
  *H04L 29/12* (2006.01)
  *G06F 15/16* (2006.01)
  *G06F 17/28* (2006.01)

(52) U.S. Cl.
  CPC .......... *H04L 61/3035* (2013.01); *G06F 15/16* (2013.01); *G06F 17/20* (2013.01); *G06F 17/28* (2013.01); *H04L 61/1511* (2013.01); *H04L 61/302* (2013.01)

(58) Field of Classification Search
  USPC .......................... 704/4, 7, 8, 9, 10, 767, 772
  See application file for complete search history.

(56) References Cited

U.S. PATENT DOCUMENTS

| | | | |
|---|---|---|---|
| 6,314,469 B1 | 11/2001 | Tan et al. | |
| 6,332,158 B1* | 12/2001 | Risley | G06F 17/30887 707/E17.115 |
| 6,393,445 B1 | 5/2002 | Chien | |
| 6,895,430 B1 | 5/2005 | Schneider | |
| 6,901,436 B1 | 5/2005 | Schneider | |
| 6,973,505 B1 | 12/2005 | Schneider | |
| 7,107,325 B1 | 9/2006 | Krish | |
| 7,130,792 B2 | 10/2006 | Tokieda et al. | |
| 7,188,138 B1 | 3/2007 | Schneider | |
| 7,194,552 B1 | 3/2007 | Schneider | |
| 7,280,999 B2* | 10/2007 | Chung | H04L 29/12132 |
| 7,386,438 B1* | 6/2008 | Franz | G06F 17/275 704/240 |
| 7,546,381 B2 | 6/2009 | Tout | |
| 7,565,402 B2 | 7/2009 | Schneider | |
| 7,584,089 B2 | 9/2009 | Kuwata et al. | |
| 7,774,432 B2 | 8/2010 | Cartmell et al. | |
| 8,037,168 B2 | 10/2011 | Schneider | |
| 8,224,994 B1 | 7/2012 | Schneider | |
| RE43,690 E | 9/2012 | Schneider et al. | |
| 8,291,048 B2* | 10/2012 | Cartmell | G06F 17/30887 704/8 |
| 8,380,488 B1* | 2/2013 | Liu | G06F 17/2217 704/8 |
| RE44,207 E | 5/2013 | Schneider | |
| 8,458,161 B2 | 6/2013 | Schneider | |
| 8,548,797 B2* | 10/2013 | Kim | G06F 17/275 704/1 |
| 8,612,565 B2 | 12/2013 | Schneider | |
| 8,635,340 B1* | 1/2014 | Schneider | |
| 2003/0163300 A1* | 8/2003 | Kasvand | G06F 17/289 704/2 |
| 2004/0015584 A1* | 1/2004 | Cartmell | G06F 17/30887 709/225 |
| 2004/0044791 A1 | 3/2004 | Pouzzner | |
| 2006/0031579 A1* | 2/2006 | Tout | G06F 17/30887 709/245 |
| 2006/0074628 A1* | 4/2006 | Elbaz | G06F 17/273 704/8 |
| 2008/0016233 A1 | 1/2008 | Schneider | |
| 2008/0059607 A1 | 3/2008 | Schneider | |
| 2008/0320167 A1 | 12/2008 | Collignon | |
| 2009/0192905 A1* | 7/2009 | Oles | G06Q 20/18 705/17 |
| 2010/0274553 A1 | 10/2010 | Raisch | |
| 2011/0106924 A1* | 5/2011 | Colosi | H04L 61/302 709/222 |
| 2012/0096019 A1* | 4/2012 | Manickam | H04L 29/12632 707/767 |
| 2015/0161097 A1* | 6/2015 | Swerdlow | G06F 17/275 704/9 |

OTHER PUBLICATIONS

Kent Johnson, "guess-language, Guess the natural language of a text" webpage and project, Google project hosting, http://code.google.com/p/guess-language, accessed Nov. 7, 2013, p. 1.

Author Unknown, "guess-language, Guess the natural language of a text, trigrams" webpage and project, http://code.google.com/p/guess-language/source/browse/trunk/guess_language/trigrams/, accessed Nov. 7, 2013, pp. 1-2.

Author Unknown, "Naive Bayes classifier," Wikipedia webpage, http://en.wikipedia.org/wiki/Naive_Bayes_classifier, accessed Nov. 7, 2013, pp. 1-9.

Banday, M. Tariq "Recent Developments in the Domain Name System", International Journal of Computer Applications (0975-8887), vol. 31, No. 2, Oct. 2011, http://research.ijcaonline.org/volume31/number2/pxc3875227.pdf, pp. 1-8.

A. Stone, "Internationalizing the Internet", Internet Computing, IEEE, vol. 7, No. 3, May-Jun. 2003, pp. 11-12.

Gabor Hojtsy., "Multilingual Web Applications with Open Source Systems", Budapest University of Technology and Economics Faculty of Electrical Engineering and Informatics Department of Control Engineering and Information Technology, May 18, 2007, http://hojtsy.hu/files/GaborHojtsyThesis.pdf, pp. 1-85.

* cited by examiner

Trigrams and Their Frequencies per 10,000 words in English

| | 1 | 2 | 3 | 4 | 5 | 6 | 7 | 8 |
|---|---|---|---|---|---|---|---|---|
| 1 | #TH 230 | AT# 41 | HIS 26 | #DE 19 | PRO 16 | #FI 13 | IGH 11 | OUN 10 |
| 2 | THE 192 | ENT 38 | #ON 26 | #CA 19 | RY# 16 | PER 13 | OVE 11 | #LA 10 |
| 3 | HE# 172 | #BE 38 | ERE 26 | RS# 19 | REA 15 | OUT 13 | IDE 11 | HAD 10 |
| 4 | #S# 129 | TIO 37 | #PR 25 | CH# 19 | EVE 15 | INT 13 | SS# 11 | #TR 10 |
| 5 | ED# 86 | OR# 37 | #ST 25 | ME# 19 | #FR 15 | #SA 13 | #UN 11 | BLE 10 |
| 6 | #OF 81 | #HE 36 | #HI 25 | CON 19 | STA 15 | ECT 13 | ULD 11 | PRE 10 |
| 7 | #AN 78 | #RE 34 | TH# 25 | ITH 18 | #WO 15 | OT# 13 | #EX 11 | HIN 10 |
| 8 | OF# 77 | LY# 34 | LL# 24 | LD# 18 | TE# 15 | ILL 13 | INE 11 | WHI 10 |
| 9 | ND# 75 | #HA 33 | #IT 23 | THI 18 | #LI 15 | OME 12 | #BY 11 | AR# 10 |
| 10 | #IN 71 | HER 32 | LE# 23 | RES 18 | ESS 15 | #PO 12 | DER 11 | OTH 10 |
| 11 | AND 70 | FOR 32 | CE# 23 | #SO 18 | AD# 15 | MAN 12 | #LO 11 | STI 10 |
| 12 | #TO 64 | #FO 31 | #IS 23 | TED 18 | #SU 14 | #NE 12 | ORE 11 | #MI 10 |
| 13 | ING 62 | #WA 31 | #NO 23 | #MO 18 | COM 14 | #OR 12 | CTI 11 | FRO 10 |
| 14 | NG# 62 | EN# 31 | TS# 23 | NCE 17 | #AT 14 | #CH 12 | STR 11 | TRA 10 |
| 15 | ER# 61 | AL# 30 | ATE 22 | WIT 17 | IVE 14 | IST 12 | #YO 10 | YOU 10 |
| 16 | TO# 58 | AN# 30 | IT# 22 | #SH 17 | #BU 14 | #HO 12 | #FA 10 | STE 10 |
| 17 | ON# 58 | #WH 29 | VE# 22 | ERS 17 | #PA 14 | #DO 12 | NTE 10 | OW# 10 |
| 18 | IN# 54 | NT# 28 | SE# 21 | MEN 17 | TY# 14 | ICA 12 | EY# 10 | #SI 10 |
| 19 | IS# 49 | #MA 27 | ALL 21 | NE# 17 | #ME 14 | AVE 12 | ROM 10 | ITI 10 |
| 20 | #A# 48 | #WI 27 | WAS 20 | #AR 16 | ONE 14 | GHT 11 | RED 10 | UND 10 |
| 21 | #CO 47 | HAT 27 | UT# 20 | NS# 16 | BE# 14 | BY# 11 | #LE 10 | BUT 10 |
| 22 | ES# 47 | TER 26 | VER 20 | ONS 16 | EST 14 | TIN 11 | #I# 10 | ET# 10 |
| 23 | ION 47 | THA 26 | #SE 20 | ARE 16 | EAR 14 | OUL 11 | #PE 10 | |
| 24 | RE# 46 | ST# 26 | #AS 20 | #DI 16 | NOT 13 | OM# 11 | OUR 10 | |
| 25 | AS# 42 | ATI 26 | #WE 20 | #AL 16 | AY# 13 | AIN 11 | RAT 10 | |

FIG. 2A

| | Trigrams and Their Frequencies per 10,000 words in French | | | | | | | |
|---|---|---|---|---|---|---|---|---|
| | 1 | 2 | 3 | 4 | 5 | 6 | 7 | 8 |
| 1 | ES# 1359 | ET# 325 | LLE 188 | ONN | #PO | UN 106 | TES 96 | RIT 81 |
| 2 | #DE 1108 | DES 294 | #D' 186 | EST | RS# | MIN 106 | SEI 95 | OND 80 |
| 3 | #LE 802 | UE# 279 | TE# 184 | TS# | #SE 130 | NTE 106 | EIL 95 | UI# 80 |
| 4 | ION 788 | EME | CLE 183 | CTI 145 | UNE | ÉSI 104 | VER 94 | #OR 80 |
| 5 | DE# 735 | #DÉ 266 | ITÉ 183 | ONT | AU# | SIO 104 | #CA 93 | ALI 80 |
| 6 | LE# 733 | UR# 261 | ICL 182 | ES# | COM | RAT 104 | #IN 91 | NIS 80 |
| 7 | NT# 673 | NE# 259 | IQU 181 | SEM | BLE | LEC 103 | STR 91 | PRE 79 |
| 8 | TIO 651 | #ET 244 | EMB | #AR | #RE | DEN 103 | IRE 91 | AT# 79 |
| 9 | ENT 602 | #AU 232 | #EN 177 | OUV | BLI 125 | TIV 103 | LIQ 90 | REP 79 |
| 10 | #CO 527 | ART 232 | ER# 176 | #SU | UN# | IDE 103 | IT# 90 | ÉTE 79 |
| 11 | ON# 505 | #DU | #PE 176 | #UN | TER | ERN 102 | #MA 87 | ANI 78 |
| 12 | LES 497 | TRE 221 | #QU | OI# | ST# | UTI 102 | SSI 86 | NDI 78 |
| 13 | #LA 478 | RTI 219 | ITI 174 | PEU | ÉES 122 | #ES 102 | OMP 86 | ANC 77 |
| 14 | #PR 478 | DU# | L'A 169 | SSE | #DA | POS 101 | TUT 85 | #TE 76 |
| 15 | LA# 474 | PRÉ 210 | LOI 168 | OU# | PUB | LEM 101 | ONC 84 | ORI 76 |
| 16 | ONS 387 | TIC 210 | RES 166 | CE# | UBL | EUT 99 | NST 84 | D'U 76 |
| 17 | RE# 386 | AR# 208 | TE# 166 | NCE | #CE | URS 98 | EPU 84 | OSI 75 |
| 18 | ATI 373 | #A# 204 | ANT 165 | IS# 137 | ALE | SID 98 | SIT 84 | ROP 75 |
| 19 | #L' 357 | PRO 201 | ASS 157 | NNE | NAT | POU 97 | #AS 84 | ORG 74 |
| 20 | NS# 356 | #SO 199 | #OU | ECT | ELL 116 | IST 97 | IVI 84 | AUX 74 |
| 21 | #PA 349 | ÉE# 193 | EUR 153 | LÉE | TIT 113 | TAT 97 | ESS 83 | RGA 74 |
| 22 | CON 339 | #RE 193 | EN# 153 | UT# | UX# | URE 97 | QUI 83 | UES 74 |
| 23 | PAR 331 | OUR | UVE 149 | MBL | NSE | NEM 97 | ITU 82 | RAN 74 |
| 24 | QUE 327 | RES 190 | IL# 147 | DAN | TRA | CES 97 | INI 82 | GAN 74 |
| 25 | MEN 326 | #LO 189 | ANS 147 | SON | STI 107 | SUR 96 | #ME 81 | #FI 73 |

FIG. 2B

AUTOMATED LANGUAGE DETECTION FOR DOMAIN NAMES

CROSS REFERENCE TO RELATED APPLICATION

This application is a continuation of U.S. patent application Ser. No. 13/648,645, filed on Oct. 10, 2012, which is incorporated herein by reference in its entirety.

TECHNICAL FIELD

The present disclosure relates generally to methods and systems for creating domain names and in particular for automated detection of languages of domain names.

BACKGROUND

A domain name, such as verisign.com, is an identification string that defines a realm of administrative autonomy, authority, or control on the Internet. Domain names are formed by the rules and procedures of the Domain Name System (DNS). A DNS allows a domain name to be in a character set that is based on ASCII characters and does not allow domain names that include non-ASCII characters used in various non-English languages and represented, for example, by multi-byte Unicode character sets. To remove such constraints, the Internet Corporation for Assigned Names and Numbers (ICANN) has approved a system called Internationalized Domain Names in Applications (IDNA), which maps Unicode strings onto a valid DNS character set using an encoding known as Punycode. Punycode is an ASCII representation of a Unicode character, designed as such to allow multi-byte characters to be represented in the ASCII-only domain naming system. For example, the Unicode name "københavn.eu" for a domain name may be mapped to the ASCII name "xn--kbenhavn-54a.eu".

Many domain name registries have adopted IDNA to enable the creation of non-ASCII internationalized domain names. An internationalized domain name (IDN) is a domain name represented by local language characters such as Unicode characters. IDNs enable Internet users to navigate the Internet in their preferred languages. An IDN may be used to represent a top-level domain (TLD) similar to dotcom (.com) or dot-edu (.edu), or may be registered as second-level domains (2LDs), similar to verisign in verisign.com, on an existing TLD.

Under some existing domain name creation systems for creating an IDN, registrants must not only enter their desired domain name, but also identify the domain name's underlying language. For example, a registrant may want to register a dotcom domain for здравейте, the Bulgarian word for "Hello.' A registrar such as GoDaddy offers to the registrant a registration interface in which, for example, the registrant fills out a request electronic form. In the form, the user enters in a domain name field the requested name, здравейте, and further selects Bulgarian under a language field. Once the registrant submits the request, the registrar may perform a search. If the registrar determines that the requested domain name has not been previously registered, it may allow the registrant to register the IDN. In particular, upon submission by the user, the registrar converts the IDN (here здравейте) to a Punycode value (for example, XN--80AEEGAHS6CWA) and uses that value in subsequent actions.

Some problems however, may arise if the registrant selects the wrong language. For instance, in the above example of the string здравейте, the registrant may mistakenly select Russian instead of Bulgarian. This selection will not be accurate, because the Russian term for "Hello" is здравствуйте and not здравейте. Many registrars and back-end registry operators will allow such a transaction to go forward with the erroneous language tag and without performing any language verification. Such a behavior may not be desirable for users. In the above example, for instance, the registrant may have mistyped the name and may have intended a valid Russian word that is different from здравейте. Alternatively, the registrant may have intended to register the name здравейте as a Bulgarian domain name and have selected Russian by error. In either case, the users may prefer that the registrar prevent the registration or at least issue a warning before allowing the registrant to register the IDN under the incorrect language. Solutions are needed to address these and similar problems related to detecting and setting the language of IDNs.

SUMMARY

In some embodiments, a method for detecting a language of an Internationalized Domain Name (IDN) comprises receiving, by an I/O interface, a string of characters for the IDN; receiving training data, including a plurality of multi-gram analyses for a set of languages; analyzing, by a processor, the string of characters based on the training data, wherein the analyzing includes extracting a set of multi-grams from the string of characters and comparing the extracted set of multi-grams with the training data; detecting the language of the IDN based on results of the analyzing.

In some embodiments, the plurality of multi-gram analyses include trigram analyses. In some embodiments, the analyzing includes using a Bayesian classification system.

In various embodiments, the method further comprises comparing the detected language of the IDN with a user selected language, and further comprises using the IDN to generate a domain name, if the comparing indicates that the detected language of the IDN is consistent with the user selected language. In some embodiments, the method further comprises rejecting the IDN for generating a domain name, if the comparing indicates that the detected language of the IDN is not consistent with the user selected language. In some embodiments, the method further comprises finding one or more suggested IDNs that are consistent with the user selected language. In some embodiments, the method further comprises proposing to a user the detected language as a substitute for the user selected language.

In some embodiments, analyzing includes calculating a set of probabilities each indicating a relative probability that the language of the IDN is one of the set of languages, and wherein detecting the language of the IDN includes presenting one or more of the set of probabilities. In some embodiments, the method further comprises rejecting the IDN if the detected language of the IDN does not belong to a set of acceptable languages.

In some embodiments, a system for detecting a language of an IDN comprises a storage for storing training data, wherein training data includes a plurality of multi-gram analyses for a set of languages; an I/O interface for receiving a string of characters for the IDN; a parser module configured to parse the string of characters and to extract a set of multi-grams from the string of characters; and a classifier module configured to compare the extracted set of multi-grams with the training data and to detect the language of the IDN.

In some embodiments, the classifier module includes a Bayesian classification system. In some embodiments, the system further comprises a decider module configured to compare the detected language of the IDN with a user selected language. In some embodiments, the decider module is further configured to reject the IDN for generating a domain name, if the decider module determines that the detected language of the IDN is not consistent with the user selected language. In some embodiments, the decider module is further configured to propose to a user one or more suggested IDNs that are consistent with the user selected language or to propose to the user the detected language as a substitute the user selected language. In some embodiments, the system further comprises a decider module configured to reject the IDN if the detected language of the IDN does not belong to a set of acceptable languages.

In some embodiments, a non-transitory computer readable medium for storing computer programs executable by one or more computers, wherein the computer programs, when executed by the one or more computers, cause the one or more computers to implement the method for detecting a language of the IDN.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings:

FIGS. 2A and 2B show exemplary tri-gram tables according to some embodiments.

DETAILED DESCRIPTION

Figure 1:
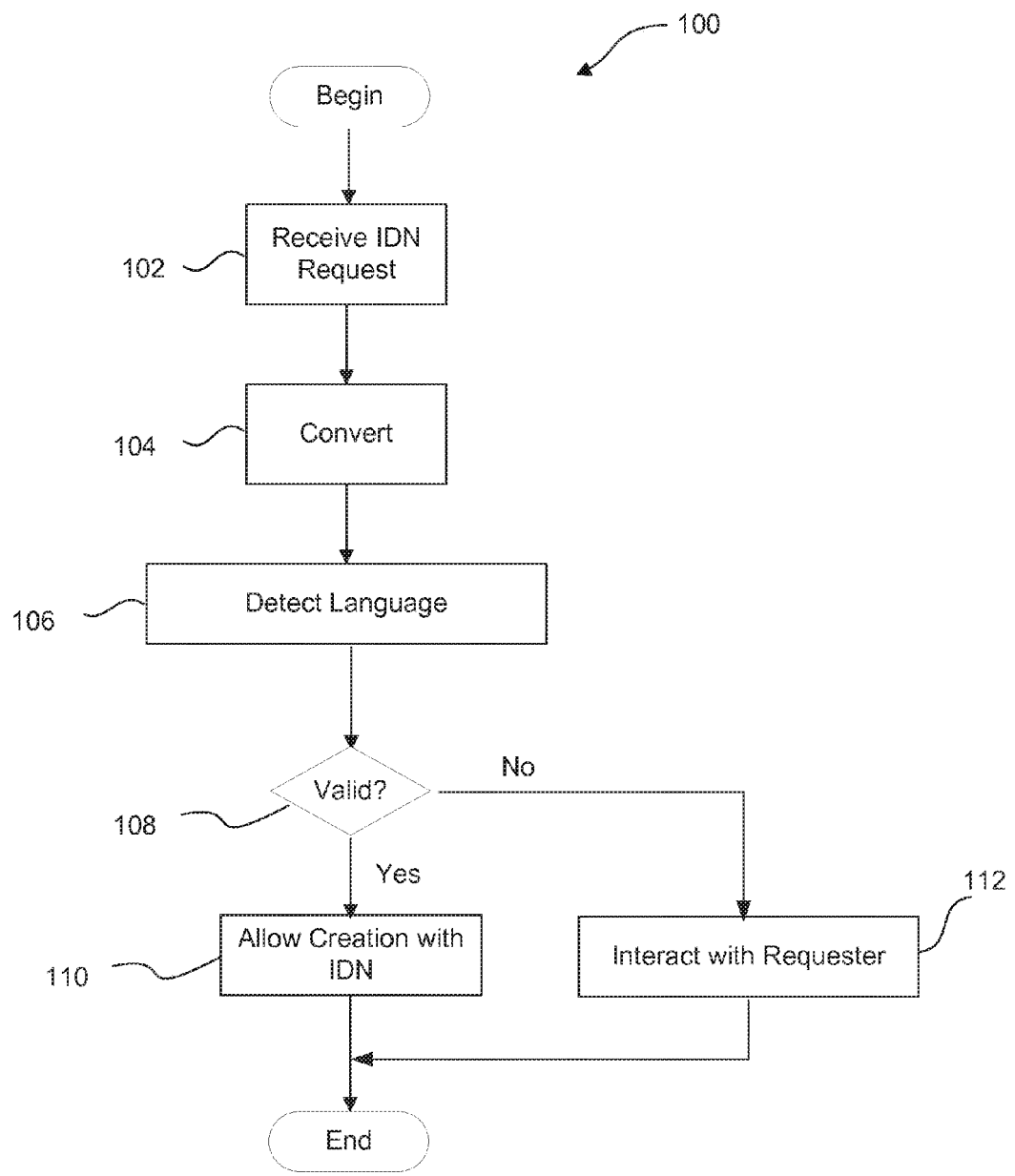
FIG. 1 shows a flow chart for validating an IDN according to various embodiments.

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the invention. Accordingly, the following detailed description does not limit the invention. Instead, the proper scope of the invention is defined by the appended claims.

To validate a requested IDN, in some embodiments a registrar performs a character-based validation of the requested IDN against the selected domain name language. To that end, the system checks that the Unicode characters in the requested IDN fall within the range of Unicode characters belonging to the selected language. Different languages, however, may share some or all of their characters. For example, Cyrillic languages (e.g., Russian, Bulgarian, etc.) all share at least some of their characters. In these cases, therefore, a character-based validation system may only determine that a requested domain name includes characters that do or do not belong to the selected language. The system cannot, thus, fully validate the language of the IDN by determining that the requested domain name, as a whole, is a valid name in the selected language. For example, the character-based validation system may determine that all characters in здравейте could be used in the Bulgarian language or in the Russian language. But the system cannot determine that the word здравейте could only be a valid name in Bulgarian and not in Russian. Therefore, the system cannot address the needs of a user who, for example, may wish to accept здравейте as a domain name only in Bulgarian and not in Russian.

Moreover, a simple search of dictionaries may not suffice to verify the language of an IDN. Many IDNs are pseudo-words of a language. A pseudo-word can be, for example, a word that is derived from, but is not identical, to one or more words in the desired language. Similarly, a pseudo-word can include parts that are derived from one or more words, or are parts of one or more words, in the desired language. For example, the domain name VeriSign may not be found as an existing word in an English dictionary. The word VeriSign, however, includes various parts (e.g., Veri, Sign), each of which can be recognized either a full word in English; or a part or a root of a word in English.

To address these needs, various embodiments provide methods and systems for automated language detection of IDNs. Some embodiments enable validating the language of an IDN. In particular, in some embodiments and unlike existing systems, a registrar may be able to check whether the language of a requested IDN is the same as the language selected by the user. In some embodiments, a language verification system is able to determine the language of a pseudo-word IDN. For example, in some embodiments, a language verification system is able to determine that the domain name verisign is, with a high probability, a pseudo-word in English. In some embodiments, if the proposed IDN does not match the selected language, the TLD system issues an error message to alert the user about the mismatch, or takes further actions to remedy the mismatch.

FIG. 1 shows a flow chart 100 for validating an IDN, as performed by an IDN language detection system and according to various embodiments. In flow chart 100, the system receives, validates, and takes actions regarding an IDN. In particular, in block 102, the system receives a request for an IDN. In various embodiments, the system receives the request from a requester who is a user or is another system.

In block 104 and according to some embodiments, the system converts the received IDN to a format usable by the system for its further analysis. In some embodiments, the system checks whether the received IDN is in Punycode and, if so, converts it into Unicode. In some embodiments, the system converts all IDNs for which the encoding is not UTF-8 to UTF-8 Unicode.

In block 106, the system detects the language of the IDN. In some embodiments, the system uses an n-gram analysis of the IDN to detect the language of the IDN, in the manner detailed below.

In block 108, the system validates the detected language. In some embodiments, the system marks the IDN as valid if the detected language is the same as the language selected by the user. In some embodiments, the system validates the detected language against a set of acceptable languages in accordance with a policy of the registry operator.

If the IDN is valid (block 108, yes), in block 110 the system allows creating a domain with the IDN. If the IDN is not valid (block 108, no), in block 112 the system interacts with the requester regarding the invalidated IDN, in the manner detailed below. In some embodiments, the method of flowchart 100 and the corresponding system is also used for detecting the language of domain names that are not international and instead belong, for example, to the western European set of languages.

To auto-detect the language of an IDN, some embodiments use multi-gram analysis. A multi-gram, or an n-gram, is a contiguous sequence of n characters in a given sequence of text or speech. A trigram, for example, is a contiguous sequence of three characters in a text or a speech. In some embodiments, for analyzing a text or an IDN, only alphabetic characters are used and non-alphabetic characters, such as numeric or punctuation characters, are excluded.

Various languages differ by the combination of multi-grams that they use. For example, various languages differ in the type or frequencies of their multi-grams, that is, what multi-grams they use and how often they use each multi-gram. FIGS. 2A and 2B, for example, compare the frequencies of trigrams in English and in French according to some embodiments. FIG. 2A shows an exemplary table 200 which includes a sorted list of the most frequently used tri-grams in English according to some embodiments. In particular, table 200 lists the trigrams in order of their frequencies, in this case their average number of occurrences in a 10,000 word English text. Each entry shows a trigram and its average frequency. Table 200 is an exemplary list, used for illustration purposes only.

The data in table 200 are included in 25 rows and 8 columns, as numbered. The data are sorted, in order of decreasing frequency, from top to bottom and then from left to right. That is, the most frequent trigram is the entry in row 1, column 1 (entry 202) and the second most frequent entry is the one in row 2, column 1 (entry 204). In the same manner, the next frequent entries follow in rows 3 to 2 of column 1, followed by entries in rows 1 to 25 of column 2, and so on, with the least frequent entry of Table 200 listed as the last entry in row 22 of column 8.

Each entry in Table 200 shows the three characters of each trigram followed by a number representing its average frequency. For trigrams in table 200, the number sign (#) represents a word boundary, which could be located in a text by, for example, a space, a period, or an apostrophe. Moreover, table 200 does not distinguish between lower and upper case letters in a trigram, and all trigrams are shown in upper case. The most frequent entry, entry 202 in row 1 of column 1, for example, includes the trigram "#TH" and the frequency 230. Entry 202, thus indicates that in an English text with 10,000 words, the combination of a word boundary followed by the two letter "t" and "h", that is a "th" at the start of a word, occurs 230 times in the average. This average frequency, 230 occurrences per 10,000 words, is the largest frequency listed in table 200. Entry 204 in row 2 of column 1, on the other hand, indicates that the second most frequent trigram in English is "THE", with an average frequency of 192 occurrences in 10,000 words. Similarly, the two entries in row 25 of column 1 and row 1 of column 2 indicate that the 25$^{th}$ and 26$^{th}$ most frequent trigrams in English texts are respectively the trigrams "AS#" with a frequency of 42, and "AT#" with a frequency of 41. The least frequent trigrams shown in table 200 are 33 entries, all with an average frequency of 10 per 10,000 words, recorded in row 15 of column 7 to row 22 of column 8. To save space, table 200 has been truncated at this frequency and does not show trigrams with average frequencies that are lower than 10 occurrences per 10,000 words.

FIG. 2B shows an exemplary table 250 which includes a sorted list of the most frequently used tri-grams in French according to some embodiments. The organization of the data in table 250 is similar to that of table 200. Entry 252, thus indicates that in a French text with 10,000 words, the trigram "ES#" is the most frequent trigram, with an average frequency of 1359 occurrences in 10,000 words. Entry 254, on the other hand, indicates that the second most frequent trigram in French is "#DE", with an average frequency of 1108 occurrences in 10,000 words. Comparing FIGS. 2A and 2B, thus indicates that an average English text can be distinguished from an average French text by the frequency of their n-grams, in this case trigrams. For instance, in French the trigram "ES#" is the most frequent trigram with an average frequency of 1359. In English, on the other hand, "ES#" is ranked 22$^{nd}$ with a frequency of 47 (see table 200, row 22, column 1). Alternatively, in some embodiments, a common English word is distinguished from a common French word based on the trigrams included in each word. In particular, in some embodiments, the language of an IDN is detected based on its trigrams. For example, a word that includes more "ES#" is more likely to be French than English. Some embodiments combine such probabilities for all trigrams of an IDN to identify an associated language with a high degree of certainty.

Figure 3:
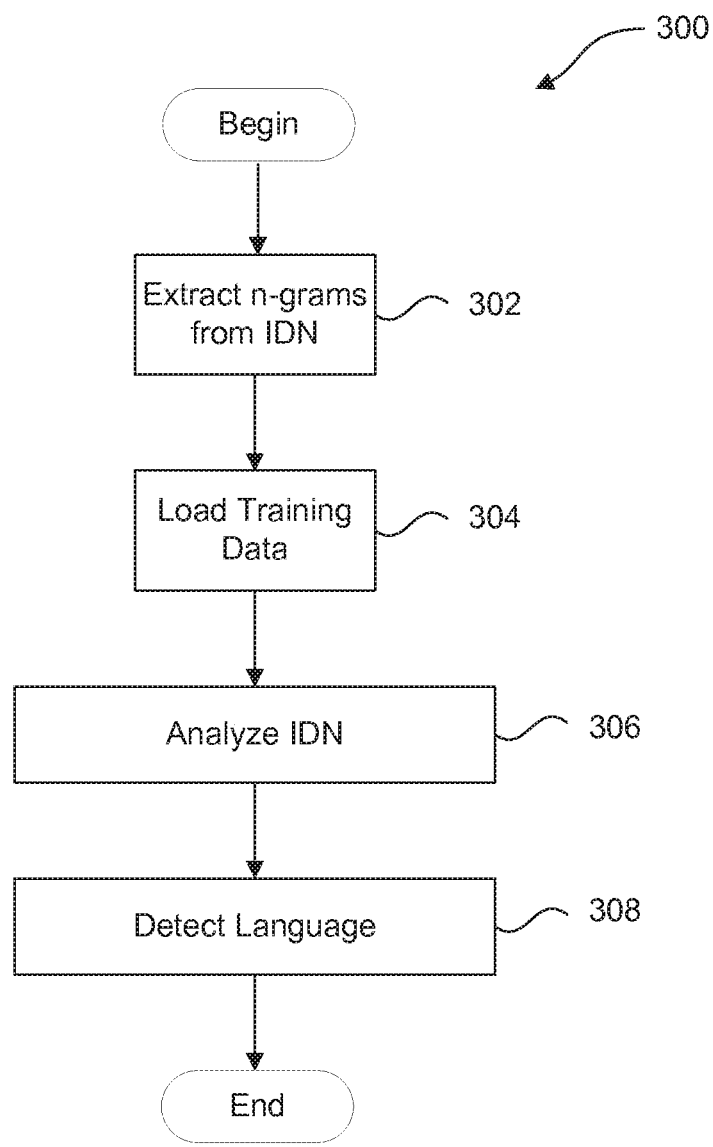
FIG. 3 shows a flowchart for detecting the language of an IDN according to some embodiments.

In some embodiments, the system detects the language of an IDN by analyzing the multi-grams used in the IDN against the frequencies of multi-grams in various languages. FIG. 3 shows a flowchart 300 for detecting the language of an IDN according to some embodiments. In flowchart 300, the system extracts multi-grams in an IDN and compares the extracted multi-grams against statistical data of multi-grams in various languages.

In particular, in block 302, the system extracts multi-grams included in the IDN to be used for analyzing the IDN. In various embodiments, the system extracts these multi-grams by parsing the string of characters in the IDN and dividing the string into consecutive multi-grams, each starting with one of the characters in the IDN. In some embodiments, the system extracts the n-grams for only one value of n. In some embodiments, the system extracts n-grams for n=3, that is, trigrams. For example, from the IDN "VeriSign", the system can extract one or more of the following trigrams: "#VE", "VER", "ERI", "RIS", "ISI", "SIG", "IGN", and "GN#". In this example, the first and last trigrams respectively include a starting and an ending word boundary. In some embodiments the system extracts and uses n-grams for more than one value of n, such as 1, 2, 3, or 4.

In some embodiments, to extract n-grams from the IDN, the system slides an n-character window over the sequence of characters in the IDN. In some embodiments, before starting the extraction, the system first appends to the IDN leading and ending spaces or other types of word boundaries (shown above as #). Code (1) is an exemplary high-level computer program for extracting n-grams from an IDN. In line 1, code (1) receives the IDN as the string "strTag1", and also receives the number n for the n-gram. In line 9, code (1) appends word boundaries to the IDN, as one space at the beginning and one space at the end (represented by a # character). In lines 13, code (1) scans the string constituting the appended IDN, from the start to n−1 characters before the end. In lines 14-16, for each of the scanned characters, code (1) extracts from the string an n-gram starting with the scanned character.

```
 1  def IndexNgrams(strTag, n):
 2      strTag = StripTLD(strTag).upper( )
 3      objNgramList = list( )
 4      IndexNgram(strTag, n, objNgramList)
 5      return objNgramList
 6
 7  def IndexNgram(strTag1, n, objNgramList):
 8
 9      strTag = "#" + strTag1 + "#"
10
11      intLength = len(strTag)
12
13      for i in range(0, intLength):
14          if i < (intLength − (n − 1)):
15              currWord = strTag[i:i+n]
16              objNgramList.append(currWord)
17
18      return
```
(1)

In block 304 of flowchart 300, the system loads training data. In various embodiments, the training data are data extracted from various languages. In some embodiments, the training data are the data for frequencies of n-grams in multiple languages. For example, in some embodiments, training data include trigram frequency data, similar to those shown in FIG. 2A or 2B. In some embodiments, training data include a list of multi-grams, sorted in order of decreasing frequency, for each of the multiple languages. In some embodiments, for each multi-gram, the training data shows its rank in the ordered list of multi-grams. In some embodiments, the training data shows the average frequency of each multi-gram. In various embodiments, frequencies are actual or normalized for each 10,000 words of text. In some embodiments, upon starting up a software application, a software initialization step pre-loads the training data to a readily accessible memory and subsequently reads that data from the memory.

In some embodiments, the multiple languages for which the training data are loaded include a set of candidate languages. As used in this application, a set can include one or more members. In some embodiments, the set of candidate languages includes the language selected by the user. Further, in some languages, the set of candidate languages includes other languages to which the IDN may belong. In some embodiments, the set of candidate languages includes one or more languages that belong to the same family of languages as the selected language. In some embodiments, the set of candidate languages includes one or more languages that share some or all of characters used by the selected language. For example, in some embodiments, if the user selects the Latin family of languages, the set of candidate languages includes English and one or more west European languages. Similarly, in some embodiments, if the user selects Cyrillic, the set of candidate languages includes Russian, Bulgarian, and Ukrainian, which have in common at least some their characters.

In various embodiments, the system obtains the training data for each of the candidate languages from a database storing those data. In some embodiments, the system derives the training data for a language by extracting multi-grams from samples of large texts in that language and computing the statistics of the extracted multi-grams. For example, in some embodiments, the statistics includes a sorted list of the frequencies of each unique multi-gram in the sample. In some embodiments, the statistics are derived from one or more large volumes of sample texts in the language. In some embodiments, the type of sample texts depends on the context of the IDN. For example, in some embodiments, for an IDN of a technical domain, the sample texts include technical texts, while for an IDN of a retail domain, the sample texts include texts that are commonly read by consumers. In some embodiments, the sample texts include texts that best represent the language, such as popular or classical books, web-based texts, legal texts such as constitutions, and newspaper articles and texts. In some embodiments, to derive the training data, the texts of a language are first divided into words and then those words are analyzed for their trigrams. In some embodiments, when analyzing the words of a text, only alphabetic characters are included and other characters such as numeric characters or punctuations are excluded from the analyzed text.

In block 306, the system uses the IDN's multi-grams (the multi-grams extracted from the IDN) and the training data to analyze the IDN. In some embodiments, the system analyzes the IDN by comparing the IDN's multi-grams with the statistics of the multi-grams in the set of candidate languages. Some embodiments analyze the IDN using a machine-learning algorithm, such as Bayesian classification. In employing Bayesian classification, some embodiments use supervised machine learning methods. Some methods are based on applying the Bayes theorem to calculating the probability of object O belonging to class C, given a list of classes with associated training data describing the unique features of each class, e.g. $P(O|C_1, \ldots C_n)$. When applied to this particular problem set, in some embodiments the variable O represents the domain name and each member of the series C represents a candidate language. Alternatively, some embodiments analyze the IDN using one or more of other methods such as Dice coefficient, Jacard coefficient, TF-IDF, Decision Trees, Support Vector Machines, or K Nearest Neighbor methods. In some embodiments, the analysis system receives the IDN's multi-grams and the training data. The system then derives the language of the IDN by comparing the IDN's multi-grams and those in the training data in the set of candidate languages.

In some embodiments, to analyze the IDN, the system first performs a character-based analysis of the IDN. In some embodiments, by doing so, the system may narrow the search for the language of the IDN by excluding some of the languages from the set of candidate languages. Alternatively, the character-based analysis may result in adding some new languages to the set of candidate languages. For example, in some embodiments, if a character-based analysis shows that the IDN includes characters that are used in Russian or Bulgarian but not in English (e.g., Cyrillic characters), the system may exclude English from the set of candidate languages, and add Russian and Bulgarian to the set of candidate languages.

In some embodiments, the system then detects the language of the IDN by analyzing its multi-grams against the training data for the candidate languages. Code (2) shows an exemplary high-level computer program for analyzing an IDN's trigrams and determining its language using the Dice coefficient method, according to one embodiment. In particular, in lines 2-3, code (2) loads the training data for the set of candidate languages. In code (2), the set of candidate languages consist of Arabic, Bulgarian, Russian, Czech, English, German, and French. Code (2) analyzes the IDN (strUTF8) by calculating a score for the IDN against each of the candidate languages. The score is a relative measure of the probability that the IDN belongs to the corresponding language as compared to other candidate languages. Code (2) finds the detected language (strLanguage) as the language for which the score (lgScore) is the largest. In line 4, code (2) initializes the largest found score to zero and in line 5, initializes the detected language to "unknown".

In line 6, code (2) extracts the IDN's trigrams by calling a function similar to that shown in code (1). In lines 7-13, code (2) loops over candidate languages. For each candidate language, code (2) calculates the score for the IDN (line 9), and picks the language with the largest score as the detected language (lines 10-13). Lines 15-28 of code (2) calculate the score of the IDN for a language. In particular, the CalculateCommon method at lines 22-28 calculates a total weight (intResults) based on IDN's trigrams. More specifically, line 25 finds the trigrams that are common between the IDN and all trigrams in the language, and lines 26-28 sums weights for those common trigrams. Each weight is based on the ordinal number of the trigram, with a larger weight for smaller ordinal number. Line 19 calculates the score by dividing the weight with the total number of trigrams in the IDN.

```
                                                                    (2)
1   def DetectLanguage(strUTF8):
2       objTrainingData = { 'Arabic' : 'ar.txt', 'Bulgarian' :
        'bg.txt', 'Russian' : 'ru.txt',
3       'Czech' : 'cs.txt', 'English' : 'en.txt', 'German' :
        'de.txt', 'French' : 'fr.txt'}
4       intScore = float(0)
5       strLanguage = "Unknown"
6       strTrigrams = IndexNgrams(strUTF8, 3)
7       for strInstance in objTrainingData:
8           strLg = GetTrigrams(objTrainingData[strInstance])
9           lgScore = calculateScore(strLg, strTrigrams)
10          if lgScore > intScore:
11              strLanguage = strInstance
12              intScore = lgScore
13      return strLanguage
14
15  def calculateScore(strLanguage, strTrigrams):
16      intRawScore = float(0)
17      intTotal = float(len(strTrigrams))
18      intCommon =
        CalculateCommon(strLanguage, strTrigrams)
19      intAnswer = float(intCommon/intTotal)
20      return intAnswer
21
22  def CalculateCommon(strLanguage, strTrigrams):
23      intResults = 0
24      intTrigramTotal = len(strLanguage)
25      objInCommon =
        set(strLanguage).intersection(set(strTrigrams))
26      for strTri in objInCommon:
27          intResults +=
            (intTrigramTotal - strLanguage.index(strTri))
28      return intResults
```

In some embodiments, the training data include n-gram frequencies, such as those shown the examples of FIGS. 2A and 2B, and calculating the total weight of an IDN uses each n-gram's frequency and not its ordinal number. Code (3) below shows an exemplary CalculateCommon method for such an embodiment. In code (3), the input variable strLanguage is a list in which the key-value pairs comprise the n-gram and the associated frequency. Moreover, at lines 5-7, the frequencies are summed and returned by the CalculateCommon method.

```
                                                                    (3)
1   def CalculateCommon(strLanguage, strTrigrams):
2       intResults = 0
3       objInCommon =
4   set(strLanguage.keys( )).intersection(set(strTrigrams))
5       for strTri in objInCommon:
6           intResults += strLanguage[strTri]
7       return intResults
```

Block 308 of the flowchart detects the language of the IDN based on the results of analyzing the IDN against the candidate languages. In some embodiments, the language of the IDN is detected as the most probable language based on the multi-gram analysis. In some embodiments, the system outputs more than one language as possible languages for an IDN. In some embodiments, the system sorts the possible languages by their probabilities.

In some embodiments, once the system detects the language of the IDN, it validates the language against a registrar's policy or one or more acceptable languages, as noted in block 108 of flowchart 100. In some embodiments the detected language is valid if it is the same as the language selected by the user. In some embodiments, a detected language is valid if it belongs to a set of acceptable languages. In some embodiments, a TLD registry system limits second-level (and higher) domain registrations to a specific subset of languages and rejects other languages. For example, an East Asian company with a brand TLD may set a policy to limit 2LD registrations to the set of acceptable languages that consists of English, Mandarin, Hangul, Vietnamese, and Japanese, while disallowing other languages.

In some embodiments, while a TLD registry does not limit the language of the 2LDs, it nevertheless validates the selected languages to improve performance, usability, and data quality for registry operators. In some embodiments, the TLD registry informs the requester registrant of a mismatch between the requested IDN's language and the selected language. In some embodiments, the TLD registry system also proposes to the requester an acceptable language or an acceptable IDN.

In various embodiments, if the IDN's language is valid, the system allows creation of a new domain with the IDN, as noted in block 110 of flowchart 100. If the IDN's language is not valid, on the other hand and as indicated in block 112 of flowchart 100, the system may interact with the requester to address the mismatch. In some embodiments, the system interacts with the requester by informing the requester of the detected language and verifying whether the requester in fact meant to create the new domain name under the detected, and not the selected, language. Alternatively, in some embodiments, the system interacts with the requester by proposing other IDNs that match the user's selected language.

Figure 4:
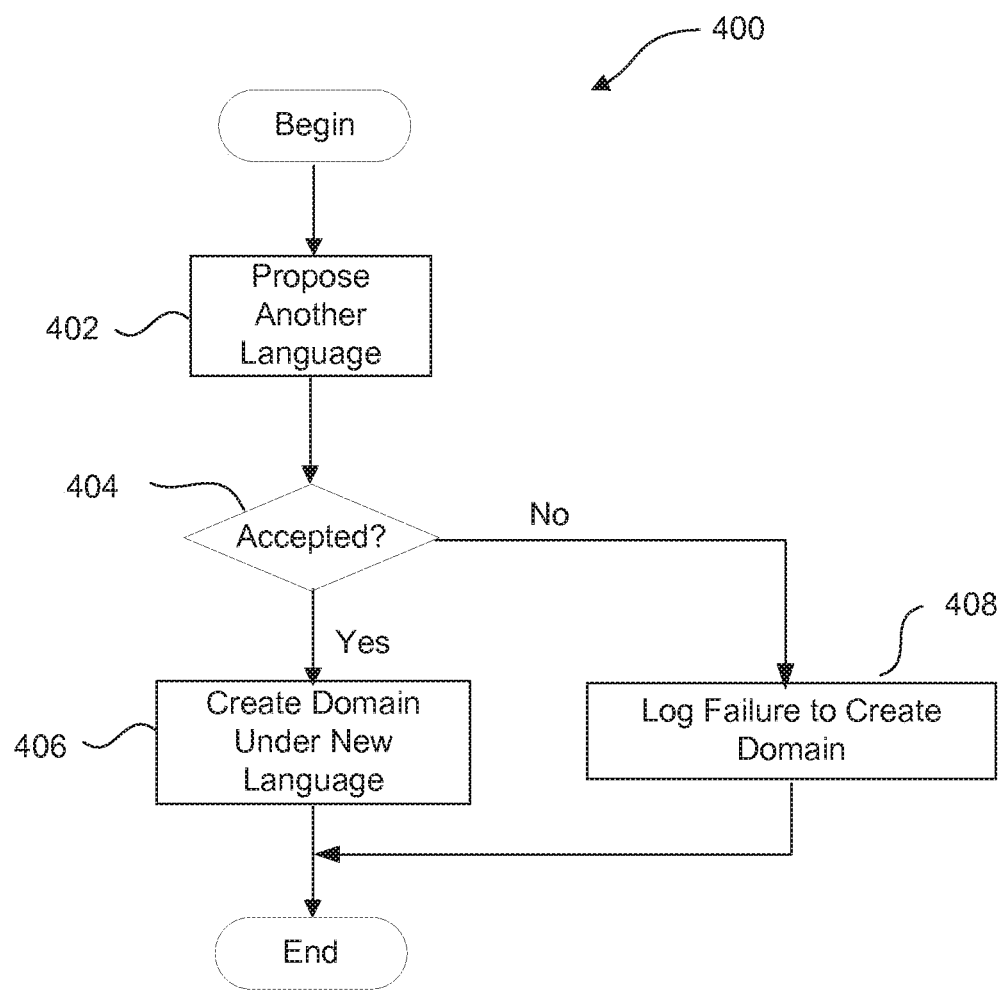
FIGS. 4 and 5 show flowcharts for interacting with a requester according to some embodiments.

FIG. 4 shows a flowchart 400 for interacting with the requester according to some embodiments. In block 402, the system proposes to the user a language other than the one selected by the user. In some embodiments, the proposed language is the detected language of the IDN.

In decision block 404, the system analyzes a response from the requester. If the requester accepts the proposed language (block 404: yes), in block 406 the system allows creation of a new domain with the proposed IDN under the proposed language. In some embodiments, the language of an IDN is recorded in a database.

If the requester does not accept the proposed language (block 404: no), in block 408 the system logs a failure for creating the domain and exits the flow chart. In various embodiments, the system logs a failure by issuing a failure message, by sending a signal indicating a failure, or by logging in a log file the details of the failure.

Figure 5:
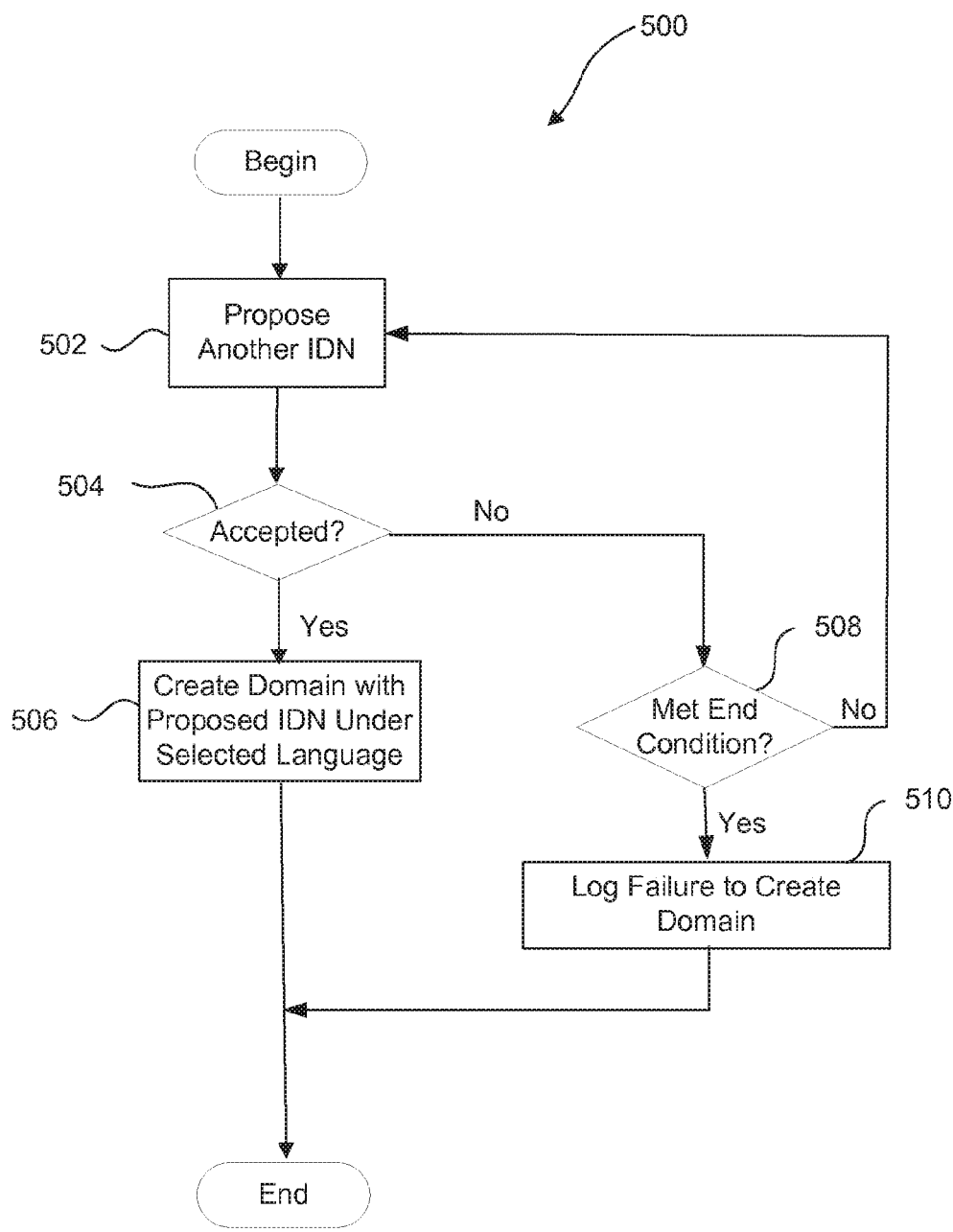

FIG. 5 shows a flowchart 500 for interacting with the requester upon finding an invalid IDN, in accordance with some embodiments. In block 502, the system proposes an IDN that is different from the IDN entered by the requester. In some embodiments, the system picks the proposed IDN from among a pool of IDNs for which the language is the detected language. In some embodiments, the pool of IDNs is a set of IDNs that are available and are consistent with some criteria entered by the requester. In some embodiments, the criteria include the type of activity, business, or users covered by the requested domain. In some embodiments, this new IDN is derived by a language look-up method that searches a dictionary in the desired language and finds a term similar to the entered IDN.

In decision block 504, the system analyzes a response from the requester as to whether or not the requester accepts the proposed IDN. If the requester accepts it (block 504: yes), in block 506 the systems allows creation of a new domain with the proposed IDN under the language selected by the requester.

If, on the other hand, the requester does not accept the proposed IDN (block 504: no), in decision block 508 the system determines whether continue with proposing other IDNs, or whether an end condition is met for ending the interaction with the requester. In various embodiments, the end condition is met if a specific time limit has been reached, a specific number of IDNs has been proposed and rejected by the requester, the requester selects an option to end the interaction, or the set of IDNs in pool of IDNs is exhausted. If the end condition is not met (block 508: no), the system loops back to block 502 and proposes a new IDN that has not yet been considered. On the other hand, if the end condition is met (block 508: yes), in block 510 the system logs a failure and exits flowchart 500.

In some embodiments, an IDN validation system is used to categorize the language of one or more IDNs. Such systems can be used by various users such as "domainers," who engage in domain name speculation and trade domain names on secondary markets. As IDNs become more prevalent, domainers may become increasingly interested in targeting language-dependent domain names that resonate with a particular geographic market. For instance, a particular domain name with no value in Russia may have a significant value in Bulgaria because it corresponds to a frequently-searched Bulgarian language keyword. Such factors are also important in "drop catching," which is the highly competitive business of registering expiring domain names as the TLD registries delete them. According to one estimate, over 100,000 domain names for all TLDs are typically deleted on any given day. In some embodiments, the IDN validation system is used to quickly categorize each available domain name by its language.

Figure 6:
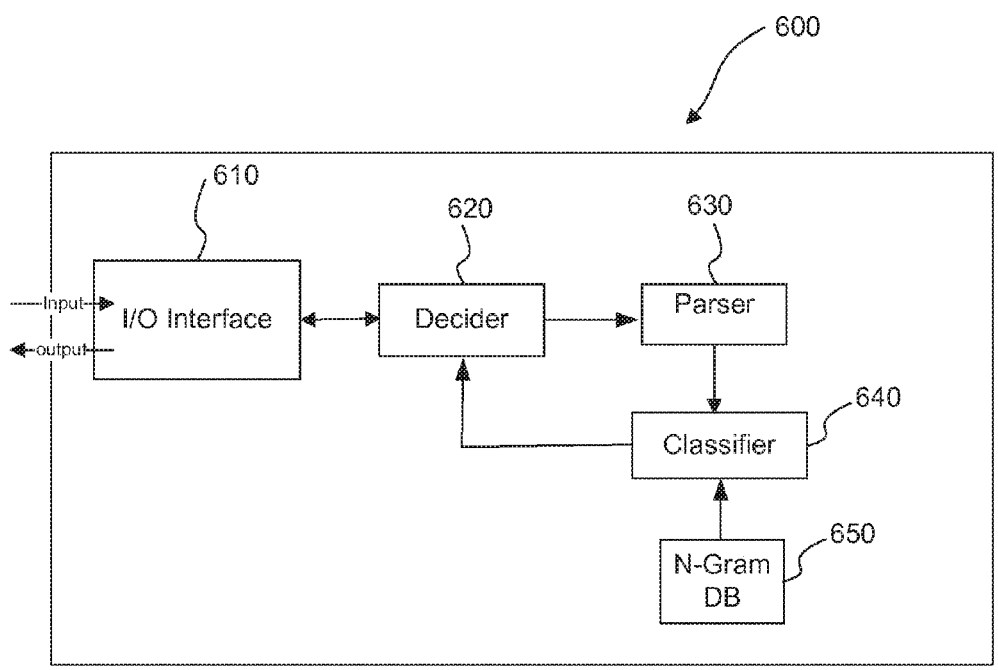
FIG. 6 shows a block diagram for an IDN validation system according to some embodiments.

In various embodiments, a system performs the methods for validation of an IDN and for interacting with a requester. FIG. 6 shows a block diagram for such a system 600 according to some embodiments. System 600 includes an input/output (I/O) interface 610, a decider module 620, a parser module 630, a classifier module 640, and an n-gram database 650.

In some embodiments, I/O interface 610 is configured for interacting with users of the system. In various embodiments, I/O interface 610 includes one or more of a mouse, a keyboard, a display, a speaker, or a touch screen. In some embodiments, I/O interface is an interface for receiving and sending data to other automated systems.

In various embodiments, decider module 620 is configured to receive the inputs, interact with other modules in system 600, or make various decisions. In particular, in some embodiments, decider module 620 is configured to received the IDN and the selected language from I/O interface 610, to send the IDN or the converted version of the IDN to parser module 630, and to receive from classifier module 640 the detected language of the IDN. Further, in various embodiments, decider module 620 is configured to make a decision whether to accept or to reject the IDN based on the detected language. Decider module 620 is also configured to interact with a requester of the IDN or to issue a signal for allowing or disallow the creation of the domain under the IDN. Further, in some embodiments, decider module is configured to propose to the requester the detected language or an IDN that is consistent with the selected language.

Parser module 630 receives the IDN from decider module 620 and extracts its n-grams. In some embodiments, parser module 630 extracts the IDN's n-grams for one or more values of n which include n=3. In various embodiments, parser module 630 passes the extracted n-grams to classifier module 640.

In some embodiments, n-gram database 650 stores training data for a set of candidate languages. In some embodiments, the stored training data correspond to a set of candidate languages commonly used by requesters of system 600. In some embodiments, the stored training data correspond to a set of languages that are acceptable to the TLD registry. In various embodiments, the training data are read from n-gram database 650 by classifier module 640.

Classifier module 640 receives IDN's extracted n-grams from parser module 630, reads training data from n-gram database 650, and accordingly detects the language of the IDN. In some embodiments, classifier module 640 utilizes one or more classification methods to detect the language of the IDN. In various embodiments, the classification methods include Naive Bayes, Dice coefficient, TF-IDF, Decision Trees, Support Vector Machines, or K Nearest Neighbor methods. In some embodiments, classifier module 640 detects the language of the IDN by comparing the extracted n-grams with the training data in the n-gram database. Classifier module 640 passes the detected language to decider module 620.

In various embodiments, one or more of the disclosed modules are implemented via one or more computer processors executing software programs for performing the functionality of the corresponding modules. In some embodiments, one or more of the disclosed modules are implemented via one or more hardware modules executing firmware for performing the functionality of the corresponding modules. In various embodiments, one or more of the disclosed modules or disclosed storage media are internal or external to the disclosed systems. In some embodiments, one or more of the disclosed modules or storage media are implemented via a computing "cloud", to which the disclosed system connects via an internet and accordingly uses the external module or storage medium. In some embodiments, the disclosed storage media for storing information include non-transitory computer-readable media, such as a CD-ROM, a computer storage, e.g., a hard disk, or a flash memory. Further, in various embodiments, one or more non-transitory computer-readable media store information or software programs executed by various modules or implementing various disclosed methods.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the invention is not limited to the above-described embodiments, but instead is defined by the appended claims in light of their full scope of equivalents.

The invention claimed is:

1. A method for automatically detecting a language of an Internationalized Domain Name (IDN), the method comprising:
    receiving, via an I/O interface, a string of characters for the IDN;
    determining, using one or more processors, a plurality of candidate languages based on analyzing the string of characters for the IDN, wherein the determining comprises: extracting a set of multi-grams from the string of characters, comparing the set of multi-grams against stored multi-grams which were previously extracted from samples of loaded training data for each language of a set of candidate languages, and calculating a probability score for each language of the set of candidate languages, and wherein each language in the plurality of candidate languages shares some or all characters with the other languages in the plurality of candidate languages or belongs to the same language family as the other languages in the plurality of candidate languages;
    presenting, via an I/O interface, the plurality of candidate languages to a user;
    receiving, via an I/O interface, a user selected language of the plurality of candidate languages corresponding to the IDN; and
    using the IDN to automatically generate a domain name in response to receiving the user selected language.

2. The method of claim 1, further comprising detecting a most probable language of the IDN based on the plurality of candidate languages.

3. The method of claim 1, wherein using the IDN to generate the domain name is further in response to validating the user selected language against a registrar's policy of acceptable languages.

4. The method of claim 3, further comprising:
    receiving a second string of characters for a second IDN;
    determining a second plurality of candidate languages based on analyzing the second string of characters for the second IDN; and
    rejecting the second IDN for generating a domain name in response to determining that the second plurality of candidate languages do not correspond to the registrar's policy of acceptable languages.

5. The method of claim 1, wherein the set of stored multi-grams include trigrams.

6. The method of claim 1, wherein presenting the plurality of candidate languages to the user comprises sorting the plurality of candidate languages based on probability scores of the plurality of candidate languages.

7. The method of claim 1, wherein the plurality of candidate languages comprises a language selected by the user.

8. A method for automatically detecting a language of an Internationalized Domain Name (IDN), the method comprising:
    receiving, via an I/O interface, a string of characters for the IDN;
    receiving, via an I/O interface, a user selected language corresponding to the IDN;
    detecting, using one or more processors, the language of the IDN based on analyzing the string of characters for the IDN, wherein the determining comprises: extracting a set of multi-grams from the string of characters, comparing the set of multi-grams against stored multi-grams which were previously extracted from samples of loaded training data for each language of a set of candidate languages, and calculating a probability score for each language of the set of candidate languages;
    determining that the language of the IDN that was detected does not match the user selected language;
    rejecting the IDN for generating a domain name in response to the determination that the language of the IDN that was detected does not match the user selected language, wherein rejecting the IDN for generating a domain name comprises transmitting, via an I/O interface, one of a proposed language or a proposed IDN, that was previously stored, to a user;
    using one of the IDN or the proposed IDN to generate a domain name in response to receiving an indication from the user that the one of the proposed language or the proposed IDN is accepted.

9. The method of claim 8, wherein:
    rejecting the IDN for generating a domain name comprises transmitting the proposed language to the user;
    the proposed language is the language of the IDN that was detected; and
    using one of the IDN or the proposed IDN to generate the domain name in response to receiving the indication from the user comprises:
        receiving an indication from the user that the proposed language is accepted; and
        using the IDN to generate a domain name.

10. The method of claim 8, wherein:
    rejecting the IDN for generating a domain name comprises transmitting the proposed IDN to the user; and
    using one of the IDN or the proposed IDN to generate the domain name in response to receiving the indication from the user comprises:
        receiving an indication from the user that the proposed IDN is accepted; and
        using the proposed IDN to generate a domain name.

11. The method of claim 8, further comprising determining a plurality of candidate languages based on the user selected language, wherein each language in the plurality of candidate languages shares some or all characters with the user selected language or belongs to the same language family as the user selected language.

12. The method of claim 8, wherein using the IDN or the proposed IDN to generate the domain name is further in response to validating the user selected language against a registrar's policy of acceptable languages.

13. The method of claim 12, the method further comprising:
receiving a second string of characters for a second IDN;
detecting a language of the second IDN based on analyzing the second string of characters for the second IDN; and
rejecting the second IDN for generating a domain name in response to determining that the language of the second IDN does not correspond to the registrar's policy of acceptable languages.

14. The method of claim 8, wherein the set of stored multi-grams include trigrams.

15. The method of claim 8, wherein detecting the language of the IDN further comprises:
presenting the plurality of candidate languages to a user;
sorting the plurality of candidate languages based on probability scores of the plurality of candidate languages; and
receiving an indication of the language of the IDN from the user.

\* \* \* \* \*